(12) United States Patent
Langstein et al.

(10) Patent No.: US 6,677,421 B2
(45) Date of Patent: Jan. 13, 2004

(54) PROCESS FOR THE PREPARATION OF ISOOLEFIN COPOLYMERS

(75) Inventors: Gerhard Langstein, Kürten (DE);
Jürgen Ismeier, Forstinning (DE);
Martin Bohnenpoll, Leverkusen (DE);
Hans Ludwig Krauss, Bamberg (DE);
Rui Resendes, Sarnia (CA)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/222,378

(22) Filed: Aug. 16, 2002

(65) Prior Publication Data

US 2003/0040590 A1 Feb. 27, 2003

(30) Foreign Application Priority Data

Aug. 21, 2001 (DE) .......................................... 101 40 859

(51) Int. Cl.$^7$ ........................ C08F 210/10; C08F 210/12
(52) U.S. Cl. ........................ 526/348; 526/158; 526/142; 526/335; 502/103; 502/125; 502/128
(58) Field of Search ................................ 526/348, 158, 526/142, 335; 502/103, 125, 128

(56) References Cited

U.S. PATENT DOCUMENTS

| | | | | |
|---|---|---|---|---|
| 2,682,531 A | | 6/1954 | Ernst et al. ................. | 260/85.3 |
| 4,465,781 A | * | 8/1984 | Le Brasseur ................. | 502/104 |
| 4,719,271 A | * | 1/1988 | Dietz ......................... | 526/114 |
| 6,015,841 A | | 1/2000 | Langstein et al. ............ | 522/29 |

FOREIGN PATENT DOCUMENTS

DE   100 42 188   3/2002

OTHER PUBLICATIONS

Ullman's Encyclopedia of Industrial Chemistry, vol. A23, (month unavailable) 1993, pp. 288–295, "Rubber, 3, Synthetic" Editors, Babara Elvers, Stephen Hawkind William Russey, and Gail Schutz.

Chemistry & Technology 49, (month unavailable) 1976, W.A. Thaler, D.J. Buckley, Sr., Meeting of The Rubber Division, ACS, Cleveland, Ohion May 6$^{th}$ to 9$^{th}$ 1975, pp. 960–966, "High–Molecular–Weight, High–Unsaturation Copolymers of Isobutylene and Conjugated Dienes. I. Synthesis".

* cited by examiner

Primary Examiner—Ling-Siu Choi
(74) Attorney, Agent, or Firm—Joseph C. Gil; Noland J. Cheung; Jennifer R. Seng

(57) ABSTRACT

The present invention provides a novel process for the preparation of isoolefin copolymers in the presence of zirconium halides and/or hafnium halides and organic acid halides, in particular for the preparation of butyl rubbers, as well as isoolefin copolymers constructed of isobutene, isoprene and optionally further monomers.

7 Claims, No Drawings

PROCESS FOR THE PREPARATION OF ISOOLEFIN COPOLYMERS

FIELD OF THE INVENTION

The present invention provides a novel process for the preparation of isoolefin copolymers in the presence of zirconium halides and/or hafnium halides and organic acid halides, in particular for the preparation of higher isoprene-containing butyl rubbers, as well as isoolefin copolymers constructed of isobutene, isoprene and optionally further monomers.

BACKGROUND OF THE INVENTION

The process currently used for the preparation of butyl rubber is known, for example, from Ullmann's Encyclopedia of Industrial Chemistry, Vol. A 23, 1993, pp. 288 to 295. The cationic copolymerization of isobutene with isoprene in the slurry process with methyl chloride as the process solvent is carried out with aluminum trichloride as an initiator with the addition of small quantities of water or hydrogen chloride at −90° C. The low polymerization temperatures are necessary in order to obtain molecular weights sufficiently high for rubber applications.

It is in principal possible to compensate for the molecular weight-lowering (=regulating) effect of the dienic comonomers by even lower reaction temperatures. However, in this case there is a more marked occurrence of the side reactions which lead to gel formation. Gel formation at reaction temperatures of around −120° C. and possible ways of reducing it are described (q.v. W. A. Thaler, D. J. Buckley, Sr., Meeting of the Rubber Division, ACS, Cleveland, Ohio, May 6th to 9th, 1975, published in Rubber Chemistry & Technology 49, 960 to 966 (1976)). On the one hand, of the auxiliary agents which are necessary here, such as $CS_2$, is difficult, and they must furthermore be utilized at relatively high concentrations.

The gel-free copolymerization of isobutene with various comonomers at temperatures of around −40° C. with the use of preformed vanadium tetrachloride to obtain products having molecular weights sufficiently high for rubber applications is additionally known (EP-A1-0 818 476).

U.S. Pat. No. 2,682,531 describes zirconium tetrachloride-ether complexes and the use thereof as catalysts for the polymerization of, inter alia, isoolefins. It is emphasized in column 2, line 20 et seq. that the use of zirconium tetrachloride alone leads to unsatisfactory results. The ether which is preferably used is β,β′-dichloroethyl ether, a carcinogen. The diphenyl ether which is likewise listed as an example results in poorly soluble complexes which have sufficient activity only at very high dosing levels. Diethyl ether (named specifically in the patent as a possible ether) results in completely ineffective complexes.

The older application DE-A-100 42 118 describes a process for the preparation of isoolefin copolymers with the use of initiator systems prepared from zirconium halides or hafnium halides in the presence of organic nitro compounds. While these initiator systems permit the preparation of highly unsaturated butyl rubbers, for example, they have the disadvantage that it is very difficult in practice to use organic nitro compounds on a large industrial scale on account of the associated explosion hazard.

SUMMARY OF THE INVENTION

The object of the present invention was to provide a process for the preparation of high molecular weight low-gel isoolefin copolymers, in particular, for the preparation of butyl rubbers having more than 2% isoprene in the polymer without the use of nitro compounds.

The present invention provides a process for the preparation of high molecular weight isoolefin copolymers in the presence of zirconium halides and/or hafnium halides, wherein the polymerization takes place in the presence of organic acid halides.

DETAILED DESCRIPTION OF THE INVENTION

The process is preferably utilized with isoolefins having 4 to 16 carbon atoms and dienes which are copolymerizable with the isoolefins, optionally in the presence of further monomers which are copolymerizable with the monomers. More preferably, isobutene and isoprene are utilized, optionally in the presence of further monomers which are copolymerizable with these.

The process is preferably carried out in a solvent which is suitable for cationic polymerization, such as halogenated and non-halogenated hydrocarbons or mixtures thereof, in particular chloroalkanes and chloroalkane/alkane mixtures, more preferably, methyl chloride and methylene chloride or mixtures thereof with alkanes.

The zirconium halide and/or hafnium halide is preferably mixed with the organic acid halide in the absence of the monomer.

The organic acid halides which are utilized are commonly known and are available generally. The acid halides preferably used according to the present invention are defined by the general formula (I)

R-COX  (I), wherein R is selected from the group of $C_1$–$C_{18}$-alkyl, $C_3$–$C_{18}$-cycloalkyl and $C_6$–$C_{24}$-cycloaryl.

$C_1$–$C_{18}$-alkyl is understood to mean any of the linear or branched alkyl radicals having 1 to 18 C atoms, which are known to those skilled in the art, such as methyl, ethyl, n-propyl, i-propyl, n-butyl, i-butyl, t-butyl, n-pentyl, i-pentyl, neopentyl, hexyl and the further homologues, which may for their part be in turn substituted. Here, alkyl, as well as cycloalkyl or aryl, such as benzyl, trimethylphenyl, ethylphenyl, are in particular, considered as substituents. Linear alkyl radicals having 1 to 18 C atoms, more preferably methyl, ethyl and benzyl, are preferred.

$C_6$–$C_{24}$-aryl is understood to mean any of the mononuclear or polynuclear aryl radicals having 6 to 24 C atoms, which are known to those skilled in the art, such as phenyl, naphthyl, anthracenyl, phenanthracenyl, and fluorenyl, which may for their part in turn be substituted. Here, alkyl, as well as cycloalkyl or aryl, such as toloyl and methylfluorenyl, are in particular considered as substituents. Phenyl is preferred.

$C_3$–$C_{18}$-cycloalkyl is understood to mean any of the mononuclear or polynuclear cycloalkyl radicals having 3 to 18 C atoms, which are known to those skilled in the art, such as cyclopropyl, cyclobutyl, cyclopentyl, cyclohexyl, cycloheptyl, cyclooctyl and the further homologues, which may for their part be in turn substituted. Here, alkyl, as well as cycloalkyl or aryl, such as benzyl, trimethylphenyl, ethylphenyl, are, in particular, considered as substituents. Cyclohexyl and cyclopentyl are preferred.

The radical X stands for the halogens: fluorine, chlorine, bromine and iodine. X preferably stands for chlorine.

The concentration of the organic acid halide in the reaction medium is preferably within the range 1 to 500 ppm, more preferably within the range 10 to 100 ppm. The molar ratio of acid halide to zirconium and/or hafnium is preferably within the range 0.5 to 50, more preferably within the range 1 to 30 and most preferably within the range 2 to 10.

The polymerization of the monomers generally takes place in a cationic manner at temperatures within the range −120° C. to +20° C., preferably within the range −95° C. to −20° C., and at pressures within the range 0.1 to 4 bar.

Suitable zirconium halides and/or hafnium halides are, for example, zirconium dichloride, zirconium trichloride, zirconium tetrachloride, zirconium oxydichloride, zirconium tetrafluoride, zirconium tetrabromide and zirconium tetraiodide, hafnium dichloride, hafnium trichloride, hafnium oxydichloride, hafnium tetrafluoride, hafnium tetrabromide and hafnium tetraiodide and hafnium tetrachloride. Zirconium halides and/or hafnium halides having sterically demanding substituents such as, for example, zirconocene dichloride or bis-(methylcyclopentadienyl) zirconium dichloride, are generally unsuitable. Zirconium tetrachloride is preferably utilized. This may be utilized advantageously in the form of a solution in an anhydrous, acid-free alkane or chloroalkane or a mixture of the two, having a zirconium concentration of less than 4 wt. %. It may be advantageous to store (age) the zirconium solution at room temperature or below for a period of from a few minutes to 1,000 hours before utilization. It may be advantageous to carry out this aging with the action of light.

It may, furthermore, be advantageous to utilize mixtures of the catalyst system according to the present invention with conventional catalysts such as $AlCl_3$ and catalyst systems which are preparable from $AlCl_3$, diethyl aluminum chloride, ethyl aluminum chloride, titanium tetrachloride, tin tetrachloride, boron trifluoride, boron trichloride, vanadium tetrachloride or methyl alumoxane, in particular $AlCl_3$ and catalyst systems which are preparable from $AlCl_3$. This combination is also provided by the invention.

When preparing such mixtures, the molar ratio of Lewis acid: zirconium and/or hafnium may be within the range 99:1 to 1:99, preferably within the range 99:1 to 1:1, more preferably within the range 20:1 to 5:1.

The molar ratio of acid halide to zirconium and/or hafnium in the case of such mixtures is preferably within the range 0.5 to 50, more preferably within the range 1 to 30 and most preferably within the range 2 to 10.

It may be advantageous to add to the catalyst system small quantities of water, alcohols, an alkyl halide or halohydrocarbon.

The polymerization may be carried out in both a continuous and also a discontinuous method. In a continuous method, the process is preferably carried out with the following three feed streams:
1. Solvent/diluent+isoolefin (preferably isobutene)
2. Diene (preferably isoprene)
3. Zirconium halide and/or hafnium halide (preferably $ZrCl_4$ in solvent)+organic acid halide.

In a discontinuous method the process may, for example, be carried out as follows:

The reactor, which is pre-cooled to reaction temperature, is charged with the solvent or diluent and the monomers. The initiator together with the acid halide in the form of a diluted solution is then pumped-in such as to allow problem-free removal of the heat of polymerization. The progress of the reaction can be tracked by means of the heat generation. The catalyst solution may also be added portion-wise through a lock.

All operations are carried out under a protective gas. After the end of polymerization the reaction is terminated with a phenolic antioxidant such as, for example, 2,2'-methylene-bis-(4-methyl-6-tert.-butylphenol), dissolved in ethanol.

The process according to the present invention enables high molecular weight isoolefin copolymers to be prepared. The double bonds are determined by the quantity of incorporated diene. The molecular weights ($M_v$) generally range from 300–1200 kg/mol (depending on the isoprene content and the reaction temperature), the polymers have a very low gel content.

The polymers which are obtainable are suitable for the production of molded bodies of all kinds, in particular tire components, most particularly so-called inner liners, as well as so-called technical rubber goods such as stoppers, damping elements, profiles, films, coatings. For these purposes, the polymers are utilized pure or in mixture with other rubbers such as BR, HNBR, NBR, SBR, EPDM or fluorinated rubbers.

The Examples which follow are provided for the purpose of illustrating the present invention:

EXAMPLES

Experimental details

The gel contents were determined in toluene after a dissolution time of 24 hours at 30° C. at a sample concentration of 12.5 g/l. The insoluble constituents were separated by ultracentrifuging (1 hour at 20,000 rpm and 25° C.). Samples having a high gel content were checked in o-dichlorobenzene at 140° C.

The solution viscosity $\eta$ of the soluble constituents was determined in toluene at 30° C. by Ubbelohde capillary viscometry.

The molecular weight $M_v$ calculated from the limit viscosity was determined in accordance with the following formula: $\ln (M_v) = 12.48 + 1.565 \cdot \ln \eta$.

The Mooney value was determined at 125° C. after a measuring time of 8 minutes.

Argon 4.8 (from Linde) was used as the protective gas.

The monomer incorporation and the "branching point"[1] were determined by means of high-field proton resonance. [1] J. L. White, T. D. Shaffer, C. J. Ruff, J. P. Cross: Macromolecules (1995) 28, 3290

The isobutene (from Gerling+Holz, Germany, 2.8 quality) utilized in the polymerizations was dried by passing through a column packed with sodium on aluminum oxide (content: 10%).

The isoprene (from Acros, 99%) used was filtered under argon through a dried aluminum oxide column to remove the stabilizer, distilled over calcium hydride under an argon atmosphere, and utilized in this form for the polymerization. The water content was 25 ppm.

The methyl chloride (from Linde, 2.8 quality) used was purified by passing through an activated charcoal column and a further column packed with Sicapent, and was utilized in this form.

The methylene chloride (from Merck, analytical grade: ACS, ISO) was dried by distillation over phosphorus pentoxide under an argon atmosphere.

The acetyl chloride (from Aldrich, 99+%) was distilled under argon.

The zirconium tetrachloride (>=98%) used was obtained from Fluka.

The aluminum trichloride (98.5%) used was obtained from Janssen Chimica.

A cooled solution of 2 g Irganox 1010 (from Ciba) in 250 ml ethanol was used to terminate the polymerizations.

Example 1

Preparation of the Initiator 0.233 g $ZrCl_4$ were weighed into a Schlenk-type vessel under argon protective gas, and 60 µl acetyl chloride were added. 100 g methyl chloride were then condensed-in at −40° C., and stirring took place at this temperature for 4 hours. The initiator solution is slightly cloudy. The initiator may be used thus or in a diluted form.

Example 2

Polymerization, Initiator Solution Metered-in

2a 700 g dry methyl chloride and 300 g isobutene were condensed at −90° C. into a Schlenk-type four-neck flask. 24.5 g isoprene were added in liquid form. The monomer feed was then temperature-controlled to −80° C. The initiator described in Example 1 was transferred into a dropping funnel cooled to −40° C. The polymerization was carried out by slow dropwise introduction of the initiator solution, such that the temperature could be maintained at −80° C. 22 ml of the initiator solution were dropped in within 17 minutes. The initially milky suspension agglomerated so strongly after 16 minutes that the internal temperature could no longer be maintained and rose to −75.2° C. The reaction was terminated. 54.6 g dry polymer having a Staudinger index of 1.7 dl/g and a gel content of 0.9% could be obtained. The 1,4-incorporated isoprene content was 2.4 mol %.

2b 700 g dry methyl chloride and 300 g isobutene were condensed at −90° C. into a Schlenk-type four-neck flask. 32.7 g isoprene were added in liquid form. The monomer feed was then temperature-controlled to −90° C. An initiator solution prepared in a manner analogous to Example 1, but stirred for only 2 hours at −40° C., was transferred into a dropping funnel cooled to −40° C. The polymerization was carried out by slow dropwise introduction of the initiator solution, such that the temperature could be maintained at −90° C. 44 ml of the initiator solution were dropped in within 30 minutes. The initially milky suspension agglomerated so strongly that the internal temperature rose to −89.4° C. The reaction was terminated after 30 min. 25.9 g dry polymer having a Staudinger index of 1.71 dl/g and a gel content of 0.9% could be obtained. The 1,4-incorporated isoprene content was 3.84 mol %.

2c 700 g dry methyl chloride and 300 g isobutene were condensed at −90° C. into a Schlenk-type four-neck flask. 40.9 g isoprene were added in liquid form. The monomer feed was then temperature-controlled to −90° C. An initiator solution prepared in a manner analogous to Example 1, but stirred for only 2 hours at −40° C., was transferred into a dropping funnel cooled to −40° C. The polymerization was carried out by slow dropwise introduction of the initiator solution, such that the temperature could be maintained at −90° C. 56 ml of the initiator solution were dropped in within 30 minutes. The initially milky suspension rapidly became very cloudy and agglomerated after 42 ml, and the internal temperature rose to =89.7° C. The reaction was terminated after 27 min. 32.6 g dry polymer having a Staudinger index of 1.47 dl/g and a gel content of 0.8% could be obtained. The 1,4-incorporated isoprene content was 4.77 mol %.

2d 700 g dry methyl chloride and 300 g isobutene were condensed at −90° C. into a Schlenk-type four-neck flask. 8.2 g isoprene were added in liquid form. The monomer feed was then temperature-controlled to −90° C. An initiator solution prepared at −40° C. from 268 mg $ZrCl_4$, 5 ml benzoyl chloride and 100 g methyl chloride was transferred into a dropping funnel cooled to −40° C. after aging for 30 minutes. The polymerization was carried out by slow dropwise introduction of the initiator solution, such that temperature could be maintained at −90° C. 82 ml of the initiator solution were dropped in within 48 minutes. The initially milky suspension agglomerated after 20 ml, and the internal temperature rose to −89.6° C. 26.5 g dry polymer having a Staudinger index of 2.44 dl/g and a gel content of 0.8% could be obtained.

Example 3

Polymerization, Initiator Solution Added Batchwise

3a 460 g dry methyl chloride and 36 g isobutene were condensed at −90° C. into a Schlenk-type four-neck flask. 2.55 g isoprene were added in liquid form. The monomer feed was then temperature-controlled to −90° C. An initiator solution prepared in a manner analogous to Example 1 was transferred into a dropping funnel cooled to −40° C. The polymerization was initiated by addition of the initiator solution by way of a Schlenk-type tube. The temperature rose to −86.5° C. The reaction was terminated after 5 min. 14.1 g dry polymer having a Staudinger index of 0.8 dl/g and a gel content of 0.4% could be obtained. The 1,4-incorporated isoprene content was 2.12 mol %.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polymer which is prepared by the polymerization of isoolefin monomers in the presence of i) zirconium halides and/or hafnium halides, and ii) organic acid halides, wherein the polymer comprises up to 30 mol % isoprene.

2. A polymer according to claim 1, wherein said organic acid halide corresponds to the general formula (I)

$$R\text{-}COX \qquad (I),$$

wherein R is selected from the group consisting of $C_1$–$C_{18}$-alkyl, $C_3$–$C_{18}$-cycloalkyl and $C_6$–$C_{24}$-cycloaryl, and X may be fluorine, chlorine, bromine or iodine.

3. A polymer according to claim 1, wherein the concentration of the organic acid halide in the reaction medium is within the range of 1 to 500 ppm.

4. A polymer according to claim 1, wherein said zirconium halide is $ZrCl_4$ and said hafnium halide is $HfCl_4$.

5. A polymer according to claim 1, wherein isobutene is copolymerized with isoprene and optionally further monomers.

6. A polymer according to claim 1, wherein $AlCl_3$ or a catalyst system which is preparable from $AlCl_3$ is additionally utilized.

7. A molded body comprising a polymer which is prepared by the polymerization of isoolefin monomers in the presence of i) zirconium halides and/or hafnium halides, and
ii) organic acid halide, wherein the polymer comprises up to 30 mol % isoprene.

* * * * *